United States Patent
Shan et al.

(10) Patent No.: US 7,236,211 B2
(45) Date of Patent: Jun. 26, 2007

(54) METHOD OF INTER-FRAME Y/C SEPARATION

(75) Inventors: Pei-Ming Shan, Hsinchu (TW); Uriah Peng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 441 days.

(21) Appl. No.: 10/708,850

(22) Filed: Mar. 29, 2004

(65) Prior Publication Data

US 2005/0134741 A1 Jun. 23, 2005

(51) Int. Cl.
*H04N 9/78* (2006.01)

(52) U.S. Cl. .................. 348/663; 348/665; 348/669; 348/701

(58) Field of Classification Search ............. 348/663, 348/665, 667, 669, 670, 666, 699, 700, 701, 348/908

See application file for complete search history.

(56) References Cited

U.S. PATENT DOCUMENTS

| | | | | |
|---|---|---|---|---|
| 5,003,389 A * | 3/1991 | Isobe et al. | ................. | 348/555 |
| 5,146,318 A * | 9/1992 | Ishizuka et al. | ............ | 348/669 |
| 5,311,306 A * | 5/1994 | Tanaka et al. | .............. | 348/702 |
| 5,473,389 A * | 12/1995 | Eto et al. | ................... | 348/669 |
| 5,502,509 A * | 3/1996 | Kurashita et al. | ........... | 348/669 |
| 5,541,669 A * | 7/1996 | Yamaguchi et al. | ........ | 348/669 |
| 5,585,861 A * | 12/1996 | Taniguchi et al. | .......... | 348/669 |
| 5,589,888 A * | 12/1996 | Iwasaki | ..................... | 348/669 |
| 5,990,978 A * | 11/1999 | Kim et al. | .................. | 348/663 |
| 6,288,754 B1 * | 9/2001 | Ito | ............................. | 348/663 |
| 6,400,762 B2 * | 6/2002 | Takeshima | ............. | 375/240.01 |
| 6,674,488 B1 * | 1/2004 | Satoh | ......................... | 348/663 |
| 6,774,954 B1 * | 8/2004 | Lee | ............................. | 348/665 |
| 6,822,691 B1 * | 11/2004 | Kim et al. | .................. | 348/452 |
| 6,995,804 B2 * | 2/2006 | Kwon et al. | ................ | 348/663 |
| 7,084,928 B2 * | 8/2006 | Tanigawa | ................... | 348/663 |
| 2005/0134743 A1 * | 6/2005 | Shan et al. | ................. | 348/670 |

FOREIGN PATENT DOCUMENTS

GB A-2163023 2/1986

* cited by examiner

*Primary Examiner*—David Ometz
*Assistant Examiner*—Jean W. Désir
(74) *Attorney, Agent, or Firm*—Jianq Chyun IP Office

(57) ABSTRACT

The present invention discloses a method of inter-frame Y/C separation. The method first samples a composite video signal for temporarily storing a plurality of sampled data $F_m P_{x,y}$, wherein the $F_m P_{x,y}$ represents data of the y pixel at the x line of the m frame, and the m, x and y are integers larger than, or equal to, 0. Then the method measures a plurality of luma data $Y_{x,y}$ by the $F_{m+1} P_{x,y}$, the $F_m P_{x,y}$, the $F_{m-1} P_{x,y}$, and the $F_{m-2} P_{x,y}$, wherein $Y_{x,y}$ represents luma data of the y pixel of the x line. Finally, the method measures a plurality of chroma data $C_{x,y}$ by the $F_{m+1} P_{x,y}$, the $F_m P_{x,y}$, the $F_{m-1} P_{x,y}$, and the $F_{m-2} P_{x,y}$, wherein $C_{x,y}$ represents luma data of the y pixel of the x line.

9 Claims, 6 Drawing Sheets

METHOD OF INTER-FRAME Y/C SEPARATION

CROSS REFERENCE TO RELATED APPLICATIONS

This application claims the priority benefit of Taiwan application serial no. 92136374, filed on Dec. 22, 2003.

BACKGROUND OF INVENTION

1. Field of the Invention

The present invention relates to a 3-D video decoding method, and more particularly to a method of inter-frame Y/C separation.

2. Description of the Related Art

With the advance of technology, electronic devices, such as television, have been widely used to transmit news, information or distant images. Moreover, monitor systems are used to monitor the situations around houses. The systems or devices can transmit video signals from the senders to the receivers.

Light is composed of red (R), green (G) and blue (B) colors. Video signals to be transmitted can be transformed into the signals thereof for transmission. Due to the limitation of the transmission bandwidth, the video signals are transformed into luma data (Y) and chroma data (U and V) for solving the issue of bandwidth. For example, the relationships between R, G and B, and Y, U and V are: Y=0.299R+0.587G+0.114B; U=0.493(BY); V=0.877(R Y). The weightings to R, G and B of the Y formula represent the sensitivities of naked eye to different colors. U and V represent blue and red after the luma is removed. For natural light, U and V are 0, which means that there is no chromatic aberration.

During signal transmission, the chroma data are carried by sub-carrier signals and then mixed with luma data. Under the standard of National Television Standards Committee (NTSC), the signals are modulated into composite video signals with the relationship of $Y+U*\sin(\omega t)+V*\cos(\omega t)$, wherein $\omega$ is equal to $2\pi*Fsc$, and Fsc represents the frequency of sub-carrier signal. Under the standard of Phase alternating Line (PAL), the signals are modulated with 180-degrees phase difference. When PAL system modulates the lines of Y, U and V of the frames, the method of $Y+U*\sin(\omega t)+V*\cos(\omega t)$, or $Y+U*\sin(\omega t)-V*\cos(\omega t)$ is alternatively applied thereto. It means that when a line is modulated by $Y+U*\sin(\omega t)+V*\cos(\omega t)$, the next line is modulated by $Y+U*\sin(wt)V*\cos(wt)$.

After the receiver receives the composite video signals, the signals should be sampled first. A comb filter samples the signals in four folds frequency of Fsc. Therefore, each line of NTSC comprises 910 sample points; each line of PAL has 1135 sample points. Each frame of NTSC has 525 lines. Accordingly, each frame of NTSC has 477,750 sample points. Each frame of PAL has 625 lines and 709,379 sample points. Because the sample points are not multiples of the lines, different phase errors exist depending on the sample positions.

Generally, the essential part of the video decoding technology is the separation of luma and chroma. The Y/C separation affects the image quality. For the high quality of image, 3-D comb filter has been widely used.

When the 3-D comb filter processes the composite video signals, the signals are sampled by 90-degree phase difference. For NTSC, the signals are Y+V, Y+U, Y-V and Y-U when the sample phases are 0, 0.5π, π and 1.5π, respectively.

FIG. 1 is a sampling result of the frame of NTSC. Referring to FIG. 1, the vertical axis represents the position x of the line in the frame, and the horizontal axis represents the position y of the pixel in the line. When two sampled data are in the neighboring frames and in the same position, the phase difference between the two data is 180 degree. The sampling relationship of the neighboring frames can also be interpreted by FIG. 1 by replacing the vertical axis with the serial number m of the frame.

Different from NTSC, PAL has 709,379 sample points having remainder 3 if divided by 4. Even if having the same position, the data in the first frame is Y+U, the data in the second frame is Y+V, and the data in the third frame is Y-U. FIG. 2A is the sampling results of PAL at the sample phase 0, 0.5π, π and 1.5π. Referring to FIG. 2A, the vertical axis represents the position x of the line in the frame or in the neighboring frame, and the horizontal axis represents the position y of the pixel in the line. To reduce the complexity for comb filter, a 45-degree phase shift is applied thereto, i.e., 0.25π, 0.75π, 1.25π and 1.75π. FIG. 2B is the sampling results of PAL at the sample phase 0.25π, 0.75π, 1.25π and 1.75π. Referring to FIG. 2B, the vertical axis represents the position x of the line in the frame or in the neighboring frame, and the horizontal axis represents the position y of the pixel in the line, wherein A=0.707(U+V) and B=0.707(U−V).

When a TV decoder samples the PAL signals in 4 times Fsc, each frame has 1135*625+4 sample points, not multiple of 625 or 1135. Therefore, when the sampling process is performed with 1135 sample points, phase errors occur. After 625 lines are sampled, the error is four pixels. Usually, the 4-pixel error is equally shared by the 625 lines. Accordingly, each line has 4/625 pixels phase shift, and the sample phase is not 0.25π, 0.75π, 1.25π and 1.75π. The modulation method of PAL is $Y+U*\sin(\omega t)+V*\cos(\omega t)$, or $Y+U*\sin(\omega t)-V*\cos(\omega t)$. When ωt is (0.25π+δ), (0.75π+δ), (1.25π+δ) and (1.75π+δ), wherein δ represents phase error, $\sin(0.25\pi+\delta)=\sin(0.25\pi)\cos(\delta)+\cos(0.25\pi)\sin(\delta)=0.707(\cos\delta+\sin\delta)=0.707(1+e_0)$; and $\cos(0.25\pi+\delta)=\cos(0.25\pi)\cos(\delta)\sin(0.25\pi)\sin(\delta)=0.707(\cos\delta-\sin\delta)=0.707(1-e_0)$. Therefore, $Y+U*\sin(\omega)+V*\cos(\omega t)=Y+0.707(U+V+e_0(U-V))=Y+A+e_B$. The other phase could be inferred with the method similar thereto, and the actual sampling results are shown in FIG. 2C, wherein the phase errors $e_A=e_0A$ and $e_B=e_0B$. FIG. 2C is the actual sampling results of PAL at the sample phase 0.25π+δ, 0.75π+δ, 1.25π+δ and 1.75π+δ. Referring to FIG. 2C, the vertical axis represents the position x of the line in the frame or in the neighboring frame, and the horizontal axis represents the position y of the pixel in the line.

FIG. 3 is a block diagram of a prior art 3-D comb filter. Referring to FIG. 3, the prior art comb filter comprises an inter-frame Y/C separator 310, a 2-D intra-filed Y/C separator, i.e., 2-D comb filter, 320, a motion detector 330, a memory 340 and a mixer 350. The composite video signal 301 is a sampled signal, and the $F_{m+1}$ represents the composite video signal of the m+1 frame. The memory 340 temporarily stores the composite video signal 301 and provides the composite video signal 305 of the frame m. The 2-D comb filter 320 receives the composite video signal 305 and performs Y/C separation by the relationship between the pixels, outputting the separated video signal 321.

The Y/C separation of the motion video signal is completed by the 2-D comb filter 320. However, the 2-D comb filter 320 results in edge obscure for still video signal. In order to improve the image quality, the still video signal is processed by the inter-frame Y/C separator 310. The prior art inter-frame Y/C separator 310 receives the sampled data of the $F_{m+1}$ and $F_m$ simultaneously, and uses the inter-frame Y/C separation method of the present invention, outputting the separated video signal 311. The motion detector 330 determines whether the composite video signal 301 is a motion or a still signal. The prior art motion detector 330 is adapted to receive the composite video signal 301 and the separated video signal 321 and measures the luma difference and chroma difference of the neighboring frames, outputting the selected signal 331 thereby. The mixer 350 selects the separated video signals 321 or 311, or mixes them according to the selected signal 331, outputting the separated video signal 351.

Following are the descriptions of the prior art method of intra-frame Y/C separation as to NTSC. Referring to FIG. 1, the prior art method adds and averages the composite video signals of the pixels with the same position, such as y, of the neighboring frames for measuring the luma data; if one subtracts another, the chroma data can be obtained. If noises are added during the modulation or signal transmission, the noises reduce the quality of the images.

Following are the descriptions of the prior art method of intra-frame Y/C separation as to PAL. Referring to FIG. 2C, the prior art method adds and averages the composite video signals of the pixels with the same position, such as y, of the frames, such as m−1, m and m+1, for removing the chroma data A or B, and the phase error $e_B$ or $e_A$, and measuring the luma data Y. If the signals of the frames subtract each other, the luma data Y can be removed, but the phase error $e_B$ or $e_A$ cannot be avoided. Therefore, stripes happen on the separated signals.

SUMMARY OF INVENTION

Therefore, the object of the present invention is to provide a method of inter-frame Y/C separation, adapted to improve the immunity against noise and precisely separate the luma data and chroma data. As to PAL system, the phase errors created by the phase difference between the frames are compensated by each other. Therefore, the method can be also applied thereto.

The present invention discloses a method of inter-frame Y/C separation, which comprises: sampling a composite video signal for temporarily storing a plurality of sampled data $F_m P_{x,y}$, wherein the $F_m P_{x,y}$ represents data of the y pixel at the x line of the m frame, and the m, x and y are integers larger than, or equal to, 0; measuring a plurality of luma data $Y_{x,y}$ by a $F_{m+1} P_{x,y}$, the $F_m P_{x,y}$, a $F_{m-1} P_{x,y}$ and a $F_{m-2} P_{x,y}$, wherein $Y_{x,y}$ represents luma data of the y pixel of the x line; and measuring a plurality of chroma data $C_{x,y}$ by the $F_{m+1} P_{x,y}$, the $F_m P_{x,y}$, the $F_{m-1} P_{x,y}$ and the $F_{m-2} P_{x,y}$, wherein $C_{x,y}$ represents luma data of the y pixel of the x line.

According to the preferred method of inter-frame Y/C separation of the present invention, the formula for measuring the luma data is: $Y_{x,y} = (F_{m+1} P_{x,y} + F_m P_{x,y} + F_{m-1} P_{x,y} + F_{m-2} P_{x,y})/4$.

According to the preferred method of inter-frame Y/C separation of the present invention, when the composite video signal is a signal of NTSC, the step of sampling the composite video signal is performed by 4 folds of frequency of a sub-carrier signal, and the phase of the sub-carrier signal is 0, 0.5π, π, or 1.5π. Moreover, the formula for measuring the chroma data $C_{x,y}$ is: $C = \pm(F_m P_{x,y} + F_{m-2} P_{x,y} - F_{m+1} P_{x,y} - F_{m-1} P_{x,y})/4$.

According to the preferred method of inter-frame Y/C separation of the present invention, when the composite video signal is a signal of PAL, the step of sampling the composite video signal is performed by 4 folds of frequency of a sub-carrier signal, and the phase of the sub-carrier signal is 0.25π, 0.75π, 1.25π, or 1.75π. Moreover, the formula for measuring the chroma data $C_{x,y}$ is: $C_{x,y} = \pm(F_{m+1} P_{x,y} + F_m P_{x,y} - F_{m-2} P_{x,y})/4$; or $C_{x,y} = \pm(F_m P_{x,y} + F_{m-1} P_{x,y} - F_{m+1} P_{x,y} - F_{m-2} P_{x,y})/4$. The chroma data C are the chroma data of the m frame.

The present invention uses four-frame data for Y/C separation. Noise interference can be reduced and the precise Y/C data can be obtained under NTSC. Under PAL, the method not only reduces the noise, but also compensates of the errors created from the phase difference between the frames. Accordingly, the method of the present invention can also be applied thereto.

In order to make the aforementioned and other objects, features and advantages of the present invention understandable, a preferred embodiment accompanied with figures is described in detail below.

DETAILED DESCRIPTION

Figure 1:
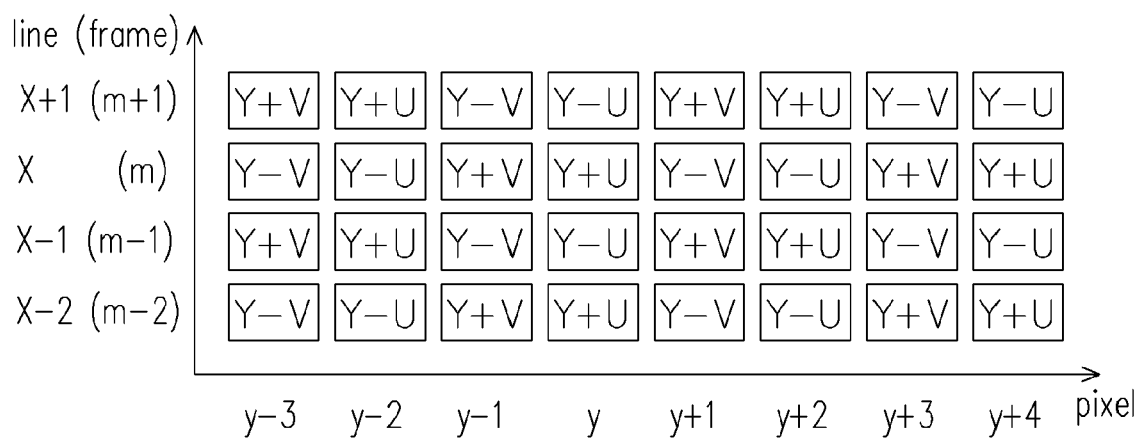
FIG. 1 is a sampling result of the frame of NTSC.
Figure 2A:
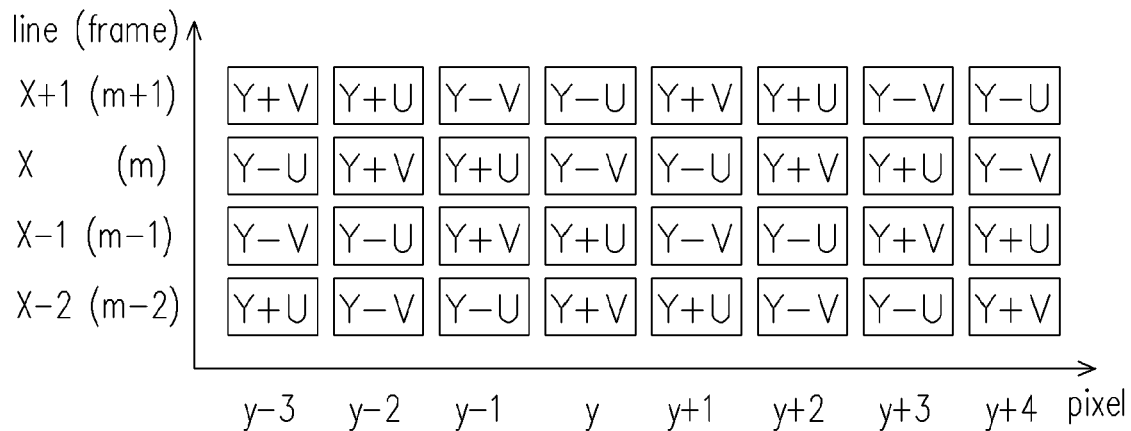
FIG. 2A is the sampling results of PAL at the sample phase 0, 0.5π, π and 1.5π.
Figure 2B:
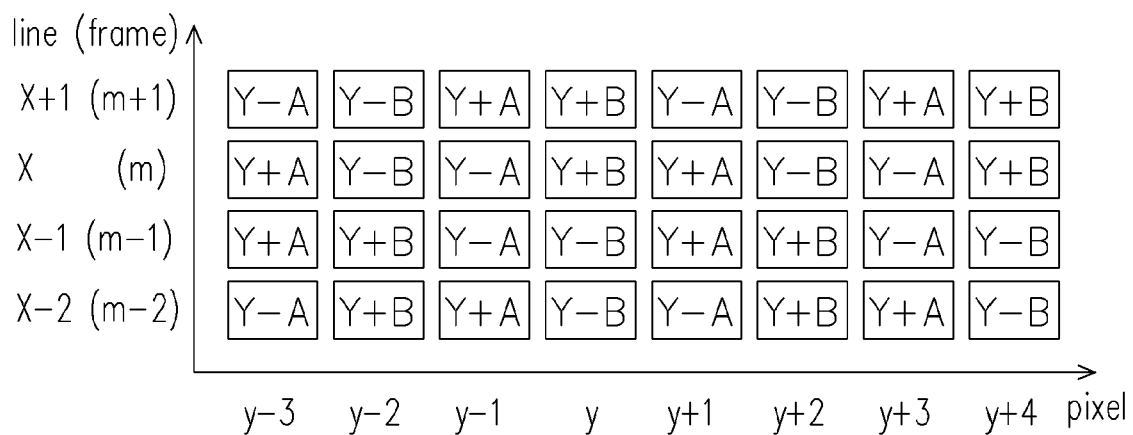
FIG. 2B is the sampling results of PAL at the sample phase 0.25π, 0.75π, 1.25π and 1.75π.
Figure 2C:
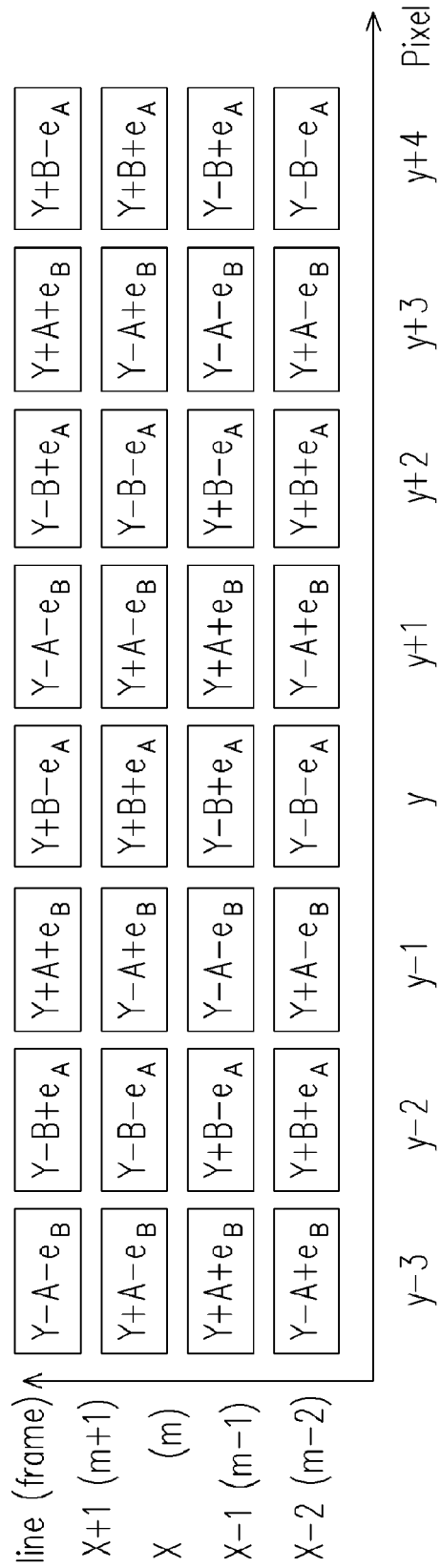
FIG. 2C is the actual sampling results of PAL at the sample phase 0.25π+δ, 0.75π+δ, 1.25π+δ and 1.75π+δ.
Figure 3:
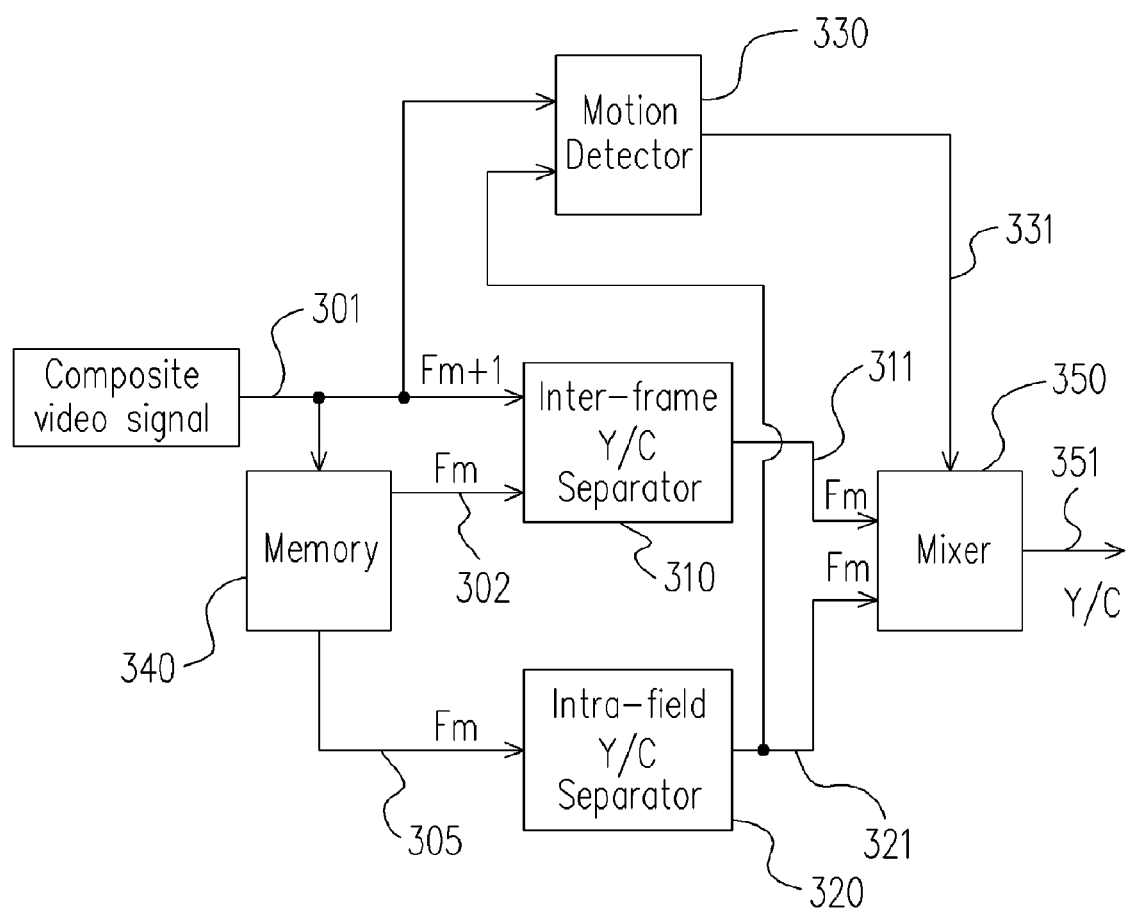
FIG. 3 is a block diagram of a prior art 3-D comb filter.
Figure 4:
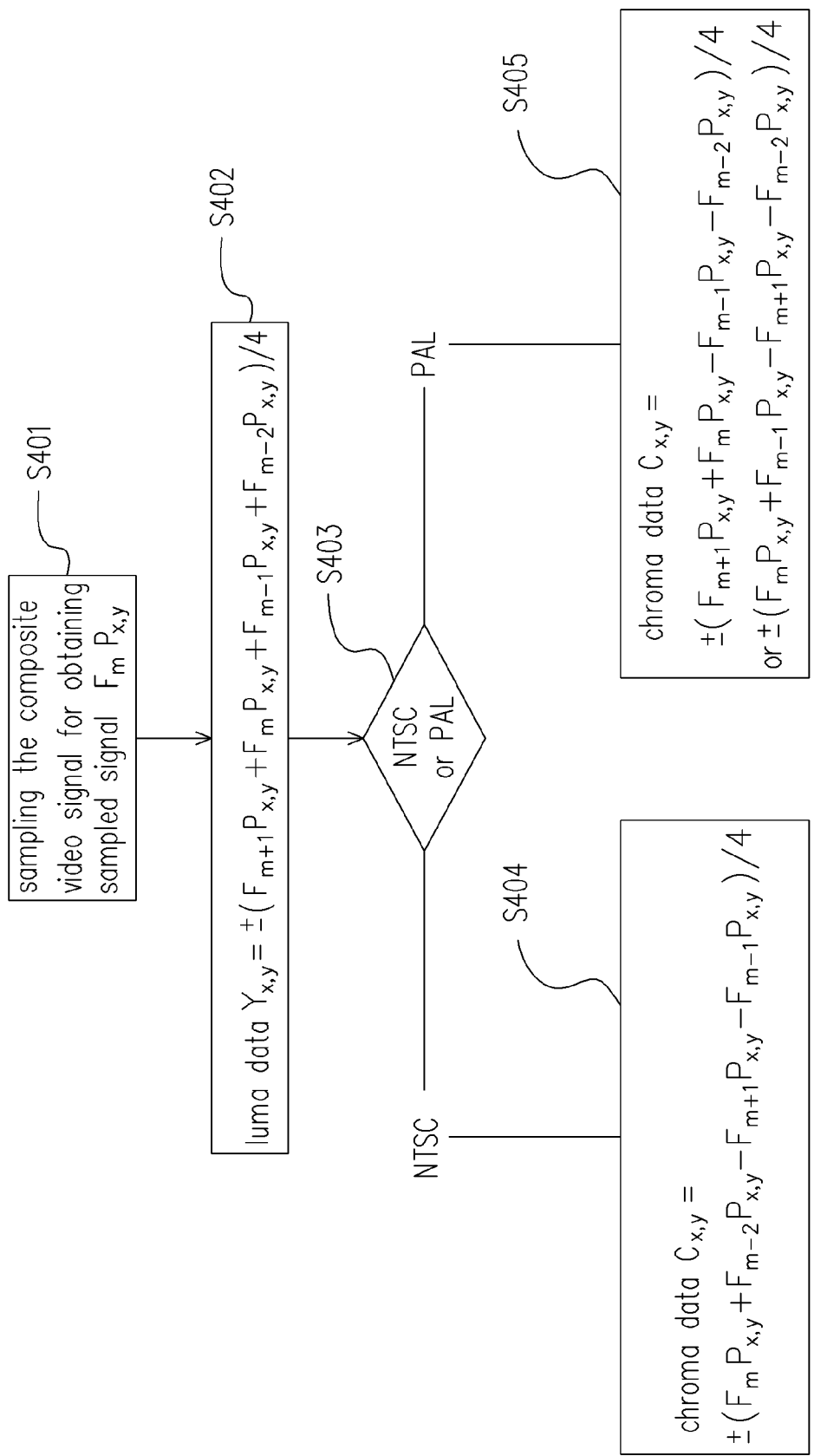
FIG. 4 is a flowchart of an exemplary method of inter-frame Y/C separation of the present invention.

FIG. 4 is a flowchart of an exemplary method of inter-frame Y/C separation of the present invention. Referring to FIGS. 1, 2C and 4, step S401 samples the composite video signal and the sampled data $F_m P_{x,y}$, wherein the $F_m P_{x,y}$ represents data of the y pixel at the x line of the m frame, and the m, x and y are integers larger than, or equal to, 0. In the embodiment, when the step S401 is performed under NTSC, the step S401 is performed by 4 folds of frequency of a sub-carrier signal, and the phase of the sub-carrier signal is 0, 0.5π, π, or 1.5π. If the step S401 is performed under PAL, the step S401 is performed by 4 folds of frequency of a sub-carrier signal, and the phase of the sub-carrier signal is 0.25π, 0.75π, 1.25π, or 1.75π.

The step S402 measures a plurality of luma data $Y_{x,y}$, wherein $Y_{x,y}$ represents luma data of the y pixel of the x line. The formula for measuring the luma data is: $Y_{x,y} = (F_{m+1} P_{x,y} + F_m P_{x,y} + F_{m-1} P_{x,y} + F_{m-2} P_{x,y})/4$. In this embodiment, $Y_{x,y}$ is, for example, the luma data of the m frame. Under NTSC of FIG. 1, wherein the vertical axis represents frame and the horizontal axis represents pixel, $Y_{x,y} = ((Y-U)+(Y+U)+(Y-U)+(Y+U))/4$. The luma data Y of the y pixel of the x line are separated from the composite video signal. Under PAL of FIG. 2C, wherein the vertical axis represents frame and the horizontal axis represents pixel, $Y_{x,y} = ((Y+B-e_A)+(Y+B+e_A)+(Y-B+e_A)+(Y-B-e_A))/4$. The luma data Y of the y pixel of the x line are also separated from the composite video signal.

The step S403 determines what type of system it is. If it is NTSC, the step S404 is performed; if it is PAL, the step S405 is performed.

The step S404 measures the chroma data $C_{x,y}$, wherein the $C_{x,y}$ represents chroma data of the y pixel of the x line. The formula for measuring the chroma data $C_{x,y}$ is: $C_{x,y}=\pm(F_m P_{x,y}+F_{m-2}P_{x,y}-F_{m+1}P_{x,y}-F_{m-1}P_{x,y})/4$. In this embodiment, the $C_{x,y}$ is, for example, the luma data of the m frame. Under NTSC of FIG. 1, wherein the vertical axis represents frame and the horizontal axis represents pixel, $C_{x,y}=((Y+U)+(Y+U)-(Y-U)-(Y-U))/4=U$.

The step S405 uses the formula $C_{x,y}=\pm(F_{m+1}P_{x,y}+F_mP_{x,y}-F_{m-1}P_{x,y}-F_{m-2}P_{x,y})/4$, or $C_{x,y}=\pm(F_mP_{x,y}+F_{m-1}P_{x,y}+F_{m-1}P_{x,y}-F_{m+1}P_{x,y}-F_{m-2}P_{x,y})/4$ to measure the chroma data of the y pixel of the x line. The formulae are used in alternative for measuring the neighboring pixels. In other words, if the $C_{x,y}$ is measured by the former, the latter is used to measure the neighboring pixels, such as $C_{x,y-1}$, $C_{x,y+1}$, $C_{x-1,y}$ and $C_{x+1,y}$. Under PAL of FIG. 2C, wherein the vertical axis represents frame and the horizontal axis represents pixel, $C_{x,y}=(F_{m+1}P_{x,y}+F_mP_{x,y}-F_{m-1}P_{x,y}-F_{m-2}P_{x,y})/4=((Y+B-e_A)+(Y+B+e_A)-(Y-B+e_A)-(Y-B-e_A))/4=B$, and $C_{x,y+1}=(F_mP_{x,y}+F_{m+1}P_{x,y}-F_{m+1}P_{x,y}-F_{m-2}P_{x,y})/4=((Y+A-e_B)+(Y+A+e_B)-(Y-A-e_B)-(Y-A+e_B))/4=A$. The chroma data C, i.e., A or B, of the y pixel of the x line are separated from the composite video signal.

Figure 5:
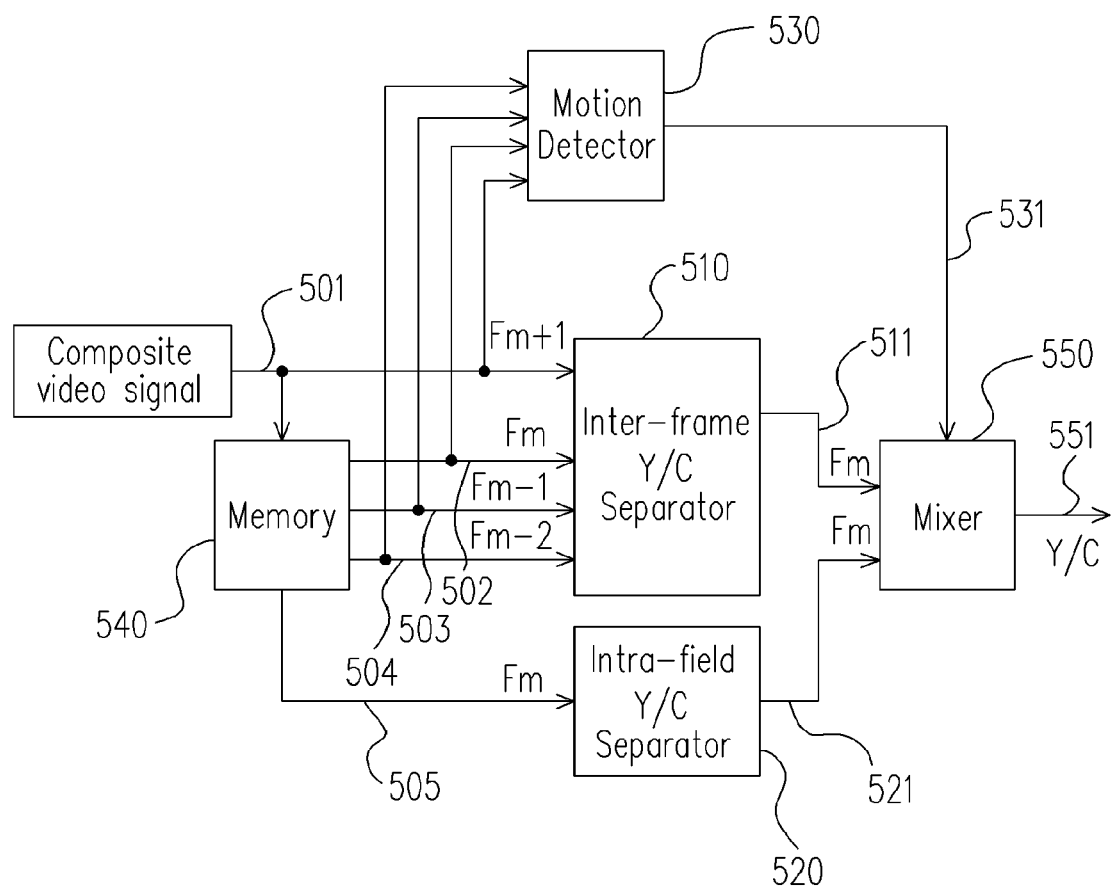
FIG. 5 is a block diagram showing a preferred method of inter-frame Y/C separation of the present invention.

According to the method of inter-frame Y/C separation, following are the description of a preferred embodiment of the present invention. FIG. 5 is a block diagram showing a preferred method of inter-frame Y/C separation of the present invention. Referring to FIG. 5, a 3-D comb filter comprises: an inter-frame Y/C separator 510, a 2-D intra-field Y/C separator, i.e., 2-D comb filter, 520, a motion detector 530, a memory 540 and a mixer 550, wherein the inter-frame Y/C separator 510 performs the function of the present invention. The composite video signal 501 is a sampled signal, and the $F_{m+1}$ represents the composite video signal of the m+1 frame. The memory 540 temporarily stores the composite video signal 501 and provides the composite video signal 502 of the m frame, the composite video signal 503 of the $m^{-1}$ frame and the composite video signal 504 of the $m^{-2}$ frame. The memory 540 also provides the composite video signal 505 of the frame m. The 2-D comb filter 520 receives the composite video signal 505 and performs Y/C separation by the relationship between the pixels, outputting the separated video signal 521.

The Y/C separation of the motion video signal is finished by the 2-D comb filter 520. In order to improve the image quality, the still video signal is processed by the inter-frame Y/C separator 510. The inter-frame Y/C separator 510 receives the sampled data of the $F_{m+1}$, $F_m$, $F_{m-1}$ and $F_{m-2}$ simultaneously, and uses the method of inter-frame Y/C separation method the present invention, outputting the separated video signal 511. The detail descriptions are not repeated. The motion detector 530 determines whether the composite video signal 501 is a motion or a still signal. The motion detector 530 also receives the sampled data of the $F_{m+1}$, $F_m$, $F_{m-1}$ and $F_{m-2}$ and measures the luma errors and chroma errors thereof, outputting the selected signal 531 thereby.

The mixer 550 selects the separated video signals 521 or 511, or mixes them according to the selected signal 531, outputting the separated video signal 551.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

The invention claimed is:

1. A method of inter-frame Y/C separation, comprising:
   sampling a composite video signal for temporarily storing a plurality of sampled data $F_mP_{x,y}$, wherein the $F_mP_{x,y}$ represents data of the y pixel at the x line of the m frame, and the m, x and y are integers larger than, or equal to, 0;
   measuring a plurality of luma data $Y_{x,y}$ by a $F_{m+1}P_{x,y}$, the $F_mP_{x,y}$, a $F_{m-1}P_{x,y}$ and a $F_{m-2}P_{x,y}$, wherein $Y_{x,y}$ represents luma data of the y pixel of the x line, and $Y_{x,y}=(F_{m+1}P_{x,y}+F_mP_{x,y}+F_{m-1}P_{x,y}+F_{m-2}P_{x,y})/4$; and
   measuring a plurality of chroma data $C_{x,y}$ by the $F_{m+1}P_{x,y}$, the $F_mP_{x,y}$, the $F_{m-1}P_{x,y}$ and the $F_{m-2}P_{x,y}$, wherein $C_{x,y}$ represents chroma data of the y pixel of the x line.

2. The method of inter-frame Y/C separation of claim 1, wherein the luma data $Y_{x,y}$ are the luma data of the m frame.

3. The method of inter-frame Y/C separation of claim 1, wherein when the composite video signal is a signal of NTSC, the step of sampling the composite video signal is performed by 4 folds of frequency of a sub-carrier signal, and the phase of the sub-carrier signal is 0, $0.5\pi$, $\pi$, or $1.5\pi$.

4. The method of inter-frame Y/C separation of claim 3, wherein a formula for measuring the chroma data is:

$$C_{x,y}=\pm(F_mP_{x,y}+F_{m-2}P_{x,y}-F_{m+1}P_{x,y}-F_{m-1}P_{x,y})/4.$$

5. The method of inter-frame Y/C separation of claim 4, wherein the chroma data $C_{x,y}$ are the chroma data of the m frame.

6. The method of inter-frame Y/C separation of claim 1, wherein the step of sampling the composite video signal is performed by 4 folds of frequency of a sub-carrier signal, and the phase of the sub-carrier signal is $0.25\pi$, $0.75\pi$, $1.25\pi$, or $1.75\pi$.

7. The method of inter-frame Y/C separation of claim 6, wherein the chroma data are measured in accordance with a formula:

$$C_{x,y}=\pm(F_{m+1}P_{x,y}+F_mP_{x,y}-F_{m-1}P_{x,y}-F_{m-2}P_{x,y})/4; \text{ or}$$

$$C_{x,y}=\pm(F_mP_{x,y}+F_{m-1}P_{x,y}-F_{m+1}P_{x,y}-F_{m-2}P_{x,y})/4.$$

8. The method of inter-frame Y/C separation of claim 7, wherein the chroma data $C_{x,y}$ are the chroma data of the m frame.

9. The method of inter-frame Y/C separation of claim 6, wherein when the composite video signal is a signal of PAL system, the step of sampling is performed at the phase of the sub-carrier signal is $0.25\pi$, $0.75\pi$, $1.25\pi$, or $1.75\pi$.

* * * * *